United States Patent Office 3,180,729
Patented Apr. 27, 1965

3,180,729
MATERIAL FOR ELECTROPHOTOGRAPHIC
REPRODUCTION
Kurt Walter Klupfel, Oskar Sus, Wilhelm Neugebauer, and Hans Behmenburg, all of Wiesbaden-Biebrich, Germany, assignors, by mesne assignments, to Azoplate Corporation, Murray Hill, N.J.
No Drawing. Filed Dec. 18, 1957, Ser. No. 703,493
Claims priority, application Germany, Dec. 22, 1956, K 30,673
40 Claims. (Cl. 96—1)

Among modern reproduction processes the electrophotographic process, also known as xerography, is becoming of increasing practical importance. It is a dry process of particular interest in certain fields, for example, office duplicating, and it consists in the application to a material consisting of an electrically conductive support and a photoconductive insulating layer adherent thereto of an electrostatic charge which imparts to the insulating layer the property of light-sensitivity. Such light-sensitive material can be used for the production of images by electrophotographic means. It is exposed to light beneath a master, so that the electrostatic charge is leaked away in the parts of the layer struck by light. The invisible electrostatic image thereby produced is made visible (developed) by powdering over with finely divided, coloured synthetic resin; the image is then given permanence (fixed) by the application of heat to the support.

Known materials used for the preparation of the photoconductive insulating layers required for the aforedescribed process include selenium, sulphur, zinc oxide, and also organic substances such as anthracene or anthraquinone. Conideration has also been given to a method of preparing the photoconductive insulating layers whereby the photoconductive substances, in association with bonding agents, are dispersed in solvents, applied thus to electrically conductive supports, primarily metal foils, and dried. However, the photoelectrically sensitizable material thus obtained has not yet satisfied the extensive demands made of modern duplicating material in respect to range of use, reliability, simplicity in handling and, not least in importance, light-sensitivity and keeping qualities.

It has now been found that if, as photoconductive substances, compounds corresponding to the general formula

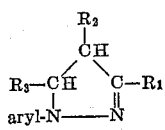

in which $R_1$ represents hydrogen, alkyl, aryl or —CH=CH-aryl, $R_2$ represents hydrogen, alkyl or aryl, and $R_3$ represents hydrogen or a monovalent radical of a carbocyclic or heterocyclic ring system of aromatic nature, are used, unexpectedly successful photoelectrically sensitizable layers, with a surprising range of practical applications are produced.

The preparation of the compounds belonging to the pyrazoline class corresponding to the above general formula and their use as provided by the invention is known. They are obtained by condensation of equimolecular quantities of α-, β-unsaturated ketones and aryl hydrazines in alcohol, using glacial acetic acid as the condensation agent. It is advantageous to work with a slight excess of aryl hydrazine.

Many of the compounds to be used as provided by the present invention have already been described in the literature; in some cases details of the preparation of various of the compounds are given hereinafter.

Examples of compounds that correspond to the above general formula are:

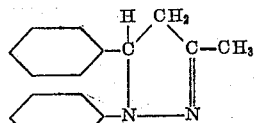

Formula 1

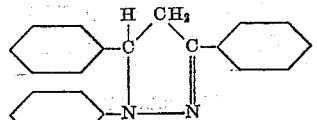

Formula 2

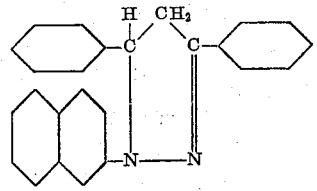

Formula 3

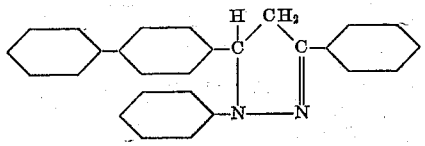

Formula 4

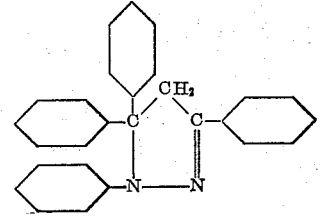

Formula 5

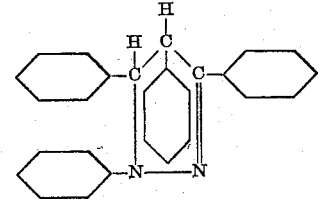

Formula 6

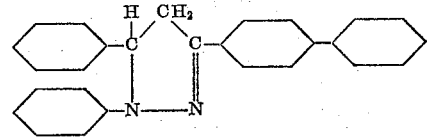

Formula 7

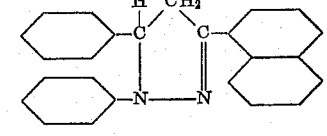

Formula 8

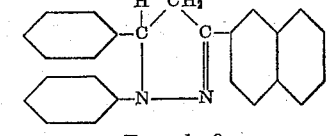

Formula 9

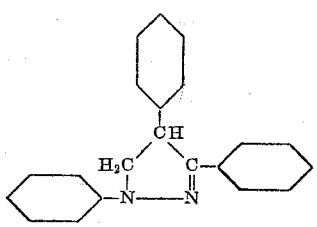
Formula 10
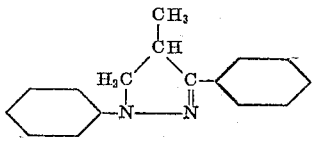
Formula 11
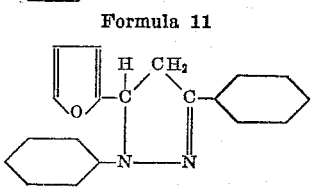
Formula 12
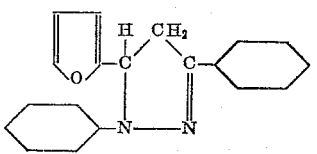
Formula 13
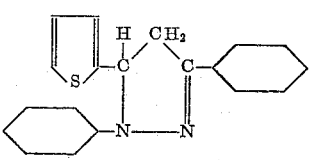
Formula 14
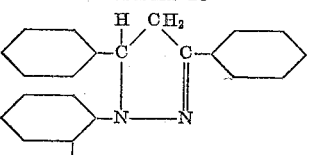
Formula 15
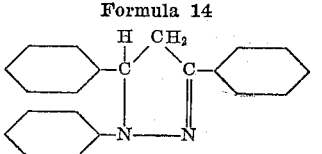
Formula 16
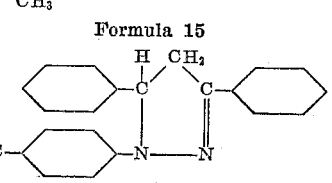
Formula 17
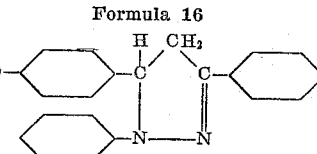
Formula 18
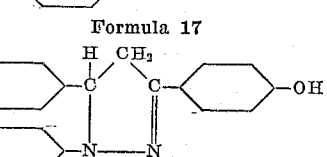
Formula 19
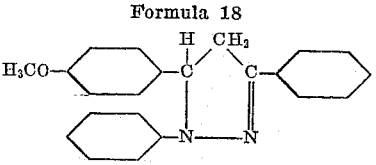
Formula 19
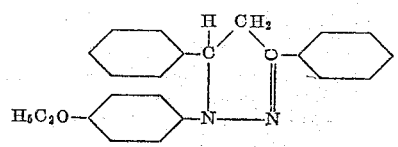
Formula 20
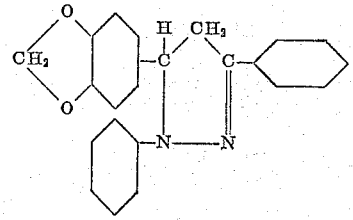
Formula 21
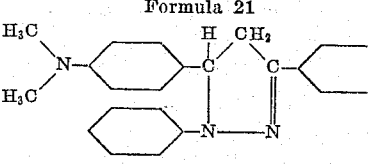
Formula 22
Formula 23
Formula 24
Formula 25
Formula 26
Formula 27
Formula 28
Formula 29

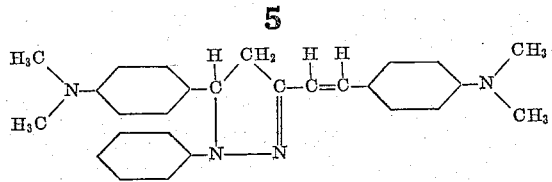

Formula 30

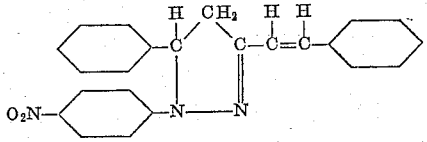

Formula 31

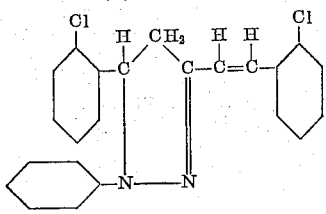

Formula 32

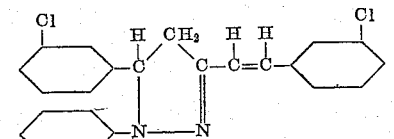

Formula 33

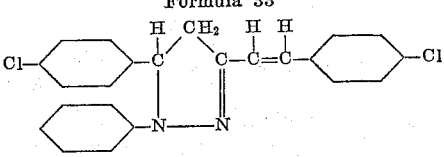

Formula 34

The melting points and, when necessary, the methods of preparation of the above compounds are as follows:

1,5-diphenyl-3-methyl-pyrazoline, melting point 112° C.

1,3,5-triphenyl-pyrazoline, melting point 139° C.

1-($\beta$)-naphthyl-3,5-diphenyl-pyrazoline, melting point 181° C. For the preparation of this compound, an alcoholic solution of 3.9 g. of 2-naphthyl-hydrazine and 4.2 g. of benzalacetophenone is boiled for two hours. After cooling has taken place, the reaction product precipitates out in light yellow flakes. It is then filtered and recrystallized from benzene/petroleum ether.

1,3 - diphenyl-5-diphenylyl - pyrazoline, melting point 170° C. This compound is obtained as a condensation product when 4.26 g. of diphenylidene-acetophenone (prepared from 5.46 g. of diphenyl-4-aldehyde and 3.6 g. of acetophenone in alcoholic solution made alkaline with sodium hydroxide) and 1.8 g. of phenyl hydrazine are boiled for one hour in glacial acetic acid. After cooling has taken place, the condensation product precipitates out and is then filtered and recrystallized from dioxane/water in a ratio of 4:1.

1,3,5,5-tetraphenyl-pyrazoline, melting point 224° C.

1,3,4,5-tetraphenyl-pyrazoline, melting point 216° C. This compound is obtained when 2.84 g. of α-benzoylstilbene and 1.1 g. of phenyl hydrazine are boiled for one hour in alcohol/glacial acetic acid in a ratio of 8:1. After cooling has taken place, the reaction product precipitates out in crystalline form. It is then filtered and purified from glacial acetic acid.

1,5 - diphenyl-3-diphenylyl - pyrazoline, melting point 205° C. This compound is obtained as a condensation product when 4.26 g. of benzal-p-phenyl-acetophenone and 1.8 g. of phenyl hydrazine are boiled for one hour in glacial acetic acid. The condensation product is allowed to crystallize out overnight and is then purified from ligroin (130° C.).

1,5-diphenyl-3-($\alpha$)-naphthyl-pyrazoline, melting point 218° C.

1,5-diphenyl-3-($\beta$)-naphthyl-pyrazoline, melting point 221° C.

1,3,4-triphenyl-pyrazoline, melting point 210° C.

1,3-diphenyl-4-methyl-pyrazoline, melting point 119° C.

1,3-diphenyl-5-furyl-pyrazoline, melting point 127° C. This compound is prepared by three hours' boiling of an alcoholic solution, made alkaline with sodium hydroxide, of 4.18 g. of furfurylidene acetophenone and 2.15 g. of phenyl hydrazine. After the reaction mixture has cooled, an oil precipitates out that becomes solid when cooled with ice. It is then filtered and purified from alcohol.

1,3-diphenyl-5-thienyl-pyrazoline, melting point 135° C. This compound is prepared by three hours' boiling of an alcoholic solution of 2.1 g. of thienylidene acetophenone and 1.2 g. of phenyl hydrazine. The reaction product is allowed to crystallise out overnight; it is then filtered off and recrystallised from alcohol.

1-o-tolyl-3,5-diphenyl-pyrazoline, melting point 84° C.

1-m-tolyl-3,5-diphenylpyrazoline, melting point 125° C.

1-p-tolyl-3,5-diphenyl-pyrazoline, melting point 166° C.

1,3-diphenyl - 5 - p - hydroxyphenyl-pyrazoline, melting point 146° C.

1,5 - diphenyl-3-p-hydroxyphenyl - pyrazoline, melting point 133° C.

1,3 - diphenyl-5-p-methoxyphenyl - pyrazoline, melting point 128° C.

1-p-ethoxyphenyl-3,5-diphenyl-pyrazoline, melting point 151° C. This compound is prepared by one hour's boiling of an alcoholic solution of 3.76 g. of p-ethoxyhenyl-hydrazine-hydrochloride and 4.16 g. of benzalacetophenone. The reaction product is allowed to crystallise out overnight; it is then filtered off and purified from dioxane/water in a 1:1 ratio.

1,3 - diphenyl - 5 - (3',4'-dihydroxymethylene) - phenyl-pyrazoline, melting point 131° C. This compound is prepared by one hour's boiling of a solution of 5.04 g. of piperonal-acetophenone and 2.2 g. of phenyl hydrazine in glacial acetic acid. After cooling has taken place the reaction product is filtered off and purified from acetic ester.

1,3 - diphenyl-5-(p-dimethylamino-phenyl) - pyrazoline, melting point 142° C.

1-p-chlorophenyl-3,5-diphenyl-pyrazoline, melting point 162° C.

1,3-diphenyl-5-p-chlorophenyl-pyrazoline, melting point 129° C.

1,3-diphenyl-5-p-bromophenyl-pyrazoline, melting point 131° C.

1,5-diphenyl-pyrazoline, melting point 134° C.

1,5-diphenyl-3-styryl-pyrazoline, melting point 152° C.

1-$\beta$-naphthyl-3-styryl-5-phenyl-pyrazoline, melting point 199° C.

1-phenyl-3-(p-methoxy-styryl)-5-(p-methoxy - phenyl)-pyrazoline, melting point 159° C.

1 - phenyl-3-(p - dimethylaminostyryl)-5-(p - dimethylamino-phenyl)-pyrazoline, melting point 192° C.

1 - p - nitrophenyl-3-styryl-5-phenyl-pyrazoline, melting point 210° C.

1-phenyl-3-o-chlorostyryl-5-o-chlorophenyl - pyrazoline, melting point 145° C.

1-phenyl-3-m-chlorostyryl-5-m-chlorophenyl-pyrazoline, melting point 104° C.

1-phenyl-3-p-chlorostyryl-5-p-chlorophenyl - pyrazoline, melting point 212° C.

The compounds used as provided by the present invention have very good light-sensitivity and are particularly suitable for the production of homogeneous coatings with unlimited shelf life. The compounds are generally colourless, although some of the compounds, e.g., those corresponding to Formulae 27–34 are yellow.

The pyrazoline substances used by the present invention for the preparation of the photoelectric insulating layers are best used in solution with organic solvents, such as benzene, acetone, methylene-chloride, glycol monomethyl ether, etc. Mixtures of several of the pyrazoline compounds may also be used, as well as mixtures of solvents. Further, it is possible for the pyrazolines of the present invention to be used in admixture with other organic photo-conductive substances.

It has furthermore been discovered that it is advantageous in the production of the photoconductive insulating layers, for organic colloids to be used in association with the compounds corresponding to the above general formula. The following may appropriately be mentioned:

The natural and synthetic resins, e.g., balsam resins, phenol resins modified with colophony and other resins of which colophony constitutes the major part, coumarone resins and indene resins and the substances covered by the collective term "synthetic lacquer resins," which according to the Kunststofftaschenbuch (Plastics Pocket Book), published by Saechtling-Zebrowski (11th edition, 1955, page 212 onwards), include processed natural substances such as cellulose ether;

Polymers such as the polyvinyl chlorides, polyvinyl acetate, polyvinyl acetals, polyvinyl alcohols, polyvinyl ethers, polyacrylic and polymethacrylic esters, as well as polystyrene and isobutylene;

Polycondensates, e.g. polyesters, such as phthalate resins, alkyd resins, malinate resins, maleic-resin/colophony/mixed esters of higher alcohols, phenol-formaldehyde resins, particularly colophony-modified phenol-formaldehyde condensates, urea-formaldehyde resins, melamine-formaldehyde condensates, aldehyde resins, ketone resins of which particular mention is to be made of AW 2 resins of the firm Badische Anilin- und Sodafabrik, xylene formaldehyde resins and polyamides;

Polyadducts, such as polyurethane.

If the pyrazoline substances are used in association with organic colloids, the proportion of resin to photoconductive substances can vary very greatly. The use of mixtures of approximately equal parts of resin and pyrazoline compound has been found advantageous.

The solutions, with added organic colloid, give, on drying, homogeneous, transparent, and, for the most part, colourless layers that can be considered as solid solutions.

The base materials used as electroconductive supports may be any that satisfy the requirements of xerography, e.g. metal, glass plates, paper, plates or foils made of electrically conductive resins, or plastic resins. If paper is to be used as the support for the photoconductive layer, pretreatment of the paper for the photoconductive insulating layers against penetration of the coating solution is advisable, e.g. a treatment with methyl-cellulose in aqueous solution or polyvinyl alcohol in aqueous solution or with a solution in acetone and methylethylketone of a copolymer of acrylic acid methyl ester and acrylonitrile or with solutions of polyamides in aqueous alcohols. Aqueous dispersions of substances suitable for the pretreatment of the paper surface may also be used.

The solutions of the compounds of the pyrazoline class to be used as provided by the invention, with or without the resins, are applied to the supports in the usual manner, for example by spraying, by direct application, by whirl coating, etc., and then dried so as to produce a homogeneous photoconductive layer on the electro-conductive support.

The layers are in themselves non-light-sensitive. However, after an electrostatic charge has been applied to the layers, i.e. after they have been charged by means of, for example, a corona discharge, the layer is light-sensitive and can be used with long-wave U.V. light of 3600–4200 A.U. for electrophotographic image-production. Very short exposure under a master to a high-pressure mercury lamp will give good images.

The layers corresponding to the present invention have, even when charged, very little sensitivity to the visible range of the spectrum. However, the further discovery has been made that the spectral sensitivity of the photoconductive layer can be extended by means of sensitizers into the visible part of the spectrum. The amount of sensitizer to be added to the photoconductive substance is mostly 1–3% by weight. The most suitable sensitizers are dyestuffs. For easier identification of the sensitizers, the number is given under which they are listed in Schultz's "Farbstofftabellen" (7th ed., 1st vol., 1931). The following are given as examples of effective sensitizers: triarylmethane dyestuffs such as Brilliant Green (No. 760, p. 314), Victoria Blue B (No. 822, p. 347), Methyl Violet (No. 783, p. 327), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Rhodamine G extra (No. 865, p. 366), Sulphorhodamine B (No. 863, p. 364), and True Acid Eosin G (No. 870, p. 368), as also phthaleins such as Eosin S (No. 883, p. 375), Eosin A (No. 881, p. 374), Erythrosin (No. 886, p. 376), Phloxin (No. 890, p. 890), Rose Bengal (No. 889, p. 890), and Fluorescein (No. 880, p. 373), thiazine dyestuffs such as Methylene Blue (No. 1038, p. 449); acridine dyestuffs such as Acridine Yellow (No. 901, p. 383), Acridine Orange (No. 908, p. 387), and Trypaflavine (No. 906, p. 386); quinoline dyestuffs such as Pinacyanol (No. 924, p. 396) and Cryptocyanine (No. 927, p. 397); quinone dyestuffs and ketone dyestuffs such as Alizarin (No. 1141, 499), Alizarin Red S (No. 1145, p. 502) and Quinizarine (No. 1148, p. 504); cyanine dyestuffs, e.g. Cyanine (No. 921, p. 394) and chlorophyll.

The production of images by electrophotographic means is carried out as follows: When the photoconductive layer has been charged by means of, for example, a corona discharge with a charging apparatus maintained at 6000–7000 volts, the support, e.g. paper, aluminum foil or plastic foil, with the sensitized layer thereon, is exposed to light under a master or by episcopic or diascopic projection, and is then dusted over in known manner with a resin powder coloured with carbon black. The image that now becomes visible can easily be wiped off. It therefore has to be fixed; it can, for example, be heated briefly, by means of an infra-red radiator, to 120° C. or to whatever the annealing temperatures of the developer used may be. The temperature required is lower if the heat treatment is carried out in the presence of vapours of solvents such as trichloroethylene, carbon tetrachloride or ethyl alcohol. Steam-fixing of the powdered image is also possible. From positive masters, positive images characterized by good contrast are produced.

After being fixed, these electrophotographic images can be converted into a printing plate. This is accomplished by wiping the support, e.g. the paper or plastic foil, with a solvent for the photoconductive layer, e.g. alcohol, or acetic acid, and then rinsing with water and inking with greasy ink in the known manner. In this way, positive printing plates are obtained which can be set up in an offset machine and used for printing. They give very long runs.

If transparent supports are used, the electrophotographic images can also be used as masters for the production of additional copies on any sort of light-sensitive sheets. In this respect the photoconductive compounds which are used in accordance with the present invention are superior to the substances used hitherto, such as selenium or zinc oxide. This is due to the fact that the latter give cloudy layers because solid solutions cannot be produced with such materials, and only suspensions are possible.

If translucent supports are used for the photoconductive layers, such as are provided by the present invention, reflex images can also be produced. The possibility of obtaining a reflex copy in itself constitutes an advantage over the known art.

Moreover the photoconductive layers prepared as provided by the invention have a further important advantage in that they can be charged positively as well as negatively. With positive charging the images are particularly good while evolution of ozone, which is injurious to health and which is very copious with negative charging, is negligible.

*Example 1*

1 g. of 1,3,5-triphenyl-pyrazoline corresponding to Formula 2 and 1 g. of resin-modified maleic acid resin, e.g. the resin marketed by Reichhold-Chemie Aktiengesellschaft, Hamburg, under the registered trademark "Beckacite" K 105, are dissolved in 30 cc. of benzene. About 15 cc. of this solution are applied evenly to a sheet of paper (size DIN A 4). After evaporation of the solvent mixture, a coating remains that adheres firmly to the surface of the paper sheet. After the coating has been electrically charged and exposed behind a master, either by the contact process or by diascopic or episcopic projection, an image of the master is obtained by dusting over with resin powder coloured with carbon black and subsequent heating, i.e., by the electrophotographic process known per se.

*Example 2*

1 g. of 1,5-diphenyl-3-styryl-pyrazoline corresponding to Formula 27 and 1 g. of non-hydrolised ketone-aldehyde condensation resin, e.g. the product produced by Chemische Werke Hüls Aktiengesellschaft, Marl, and marketed under the trade name Kunstharz AP, are dissolved in 30 g. of toluene. The solution is applied, e.g. whirl-coated, on to an acetate foil and dried. On this foil, images can be produced electrophotographically, the foil being charged by means of a corona discharge, exposed under a positive master and then dusted over with resin powder coloured with carbon black in the known manner. After being heated (fixed) these images can be used, for example, as a master tracing.

*Example 3*

1 g. of 1,3-diphenyl-5-p-hydroxyphenyl-pyrazoline corresponding to Formula 17 and 1.5 g. of ketone resin, e.g. the Kunstharz EM prepared by polycondensation by Rheinpreussen GmbH, Homberg-Ndrh., are dissolved in 30 cc. of glycol monomethyl ether. To this solution is added 0.01 g. of rhodamine B (Schultz "Farbstofftabellen," 7th edition, 1st vol., No. 864); this solution is applied to a paper sheet which, by means of a precoat, has been rendered impermeable to organic solvents. After evaporation of the solvent the coating adheres firmly to the surface of the paper sheet. The coated paper sheet is provided with a positive electrostatic charge in the known manner and the sensitized paper is exposed under a positive master, for example, to the light of a 100-watt incandescent lamp for 0.5 second, at a distance of 15 cm. The exposed surface is then dusted with a resin powder coloured with carbon black. A positive image is produced which is fixed by treatment with trichloroethylene fumes.

*Example 4*

1 g. of 1-phenyl-3-p-dimethylaminostyryl-5-p-dimethylamino-phenyl-pyrazoline corresponding to Formula 30 and 1 g. of resin blende, e.g. the product marketed by Robert Krämer, Bremen, under the registered trademark Erkazit Zinkharz 165, are dissolved in 30 cc. of benzene. The solution is applied to a paper sheet prepared in accordance with one of the following American patents: No. 2,534,650, No. 2,681,617 or No. 2,559,610, or to an aluminium foil the surface of which has been cleaned free of grease. After evaporation of the solvent the coating adheres firmly to the surface of the aluminium foil. On the coated foil there are produced electrophotographically images with good contrast effects. These images are fixed by heating and the sheet or foil is then converted into a printing plate. For this purpose, the paper sheet or aluminium foil is wiped over with a 96% ethyl alcohol solution, rinsed well with water and then inked with 1% phosphoric acid and greasy ink. Positive printing plates are obtained which can be set up in an offset machine and used for printing.

*Example 5*

1 g. of 1,5-diphenyl-3-($\alpha$)-naphthyl-pyrazoline corresponding to Formula 8 and 2 g. of resin-modified maleic acid resin e.g. the product marketed by Reichhold-Chemie Aktiengesellschaft, Hamburg, under the registered trademark "Beckacite" K 125, are dissolved in 50 cc. of a 1:1 benzene/methylenechloride mixture. Two lots of 15 cc. of this solution are applied one after the other to a foil of transparent paper (80 g.s.m.) of size DIN A 4, to form a coating. After evaporation of the solvent the coating is dried under an infra-red radiator; it then adheres firmly to the surface of the paper foil. On this paper there are produced by the electrophotographic process images with good contrast effect on practically colourless ground; these are for use as master tracings.

*Example 6*

1 g. of 1,3,5-triphenyl-pyrazoline corresponding to Formula 2 and 1.5 g. of coumarone resin, e.g. the Cumaronharz 701/70 marketed by the Gesellschaft für Teerverwertung, Duisberg-Meiderich, are dissolved in a mixture of 15 cc. of benzene and 15 cc. of acetone. This solution is applied to a paper produced by Hoffmann und Engelmann (80 g.s.m.) that has been precoated with a cellulose ether solution, e.g. an aqueous solution of the product marketed under the registered trademark "Tylose" SL 600; it is then dried. For the production of an image by electrophotographic means, the procedure is the same as that described in Example 3. From a positive master a positive image with very good contrast is obtained; fixing may be carried out by steam.

*Example 7*

1 g. of 1,5-diphenyl-3-styryl-pyrazoline corresponding to Formula 27, 1 g. of 1-phenyl-3-p-methoxy-styryl-5-p-methoxy-phenyl-pyrazoline corresponding to Formula 29 and 1 g. of 1-phenyl-3-p-dimethylamino-styryl-5-p-dimethylaminophenyl-pyrazoline corresponding to Formula 30 are dissolved in 100 cc. of benzene. About 15 cc. of this solution are applied to a paper sheet of size DIN A 4, the surface of which has been pretreated against the penetration of organic solvents; it is then dried. With the coated paper sheet, electrophotographic images can be produced as described in Example 1. If a sheet of paper is laid upon the unfixed image in carbon black-resin and recharging by means of a corona discharge is carried out, the image in carbon black-resin powder is transferred from the electrophotographic coating to the paper, where it forms a mirror image. If the carbon-black-resin image is transferred to transparent paper or to a transparent plastic foil, the image obtained can be further copied, for example, on diazo photoprinting paper.

The resin powder used for dusting in the above examples may be obtained by fusing 30 parts by weight of polystyrene (K-Wert 55) and 30 parts by weight of a maleic acid resin modified with resin sold under the trade name "Beckacite K 105." This resin powder is mixed with 3 parts by weight of the carbon black, the mixture (toner) being used as it is well known in the art for developing the electrostatic latent image, e.g. in combination with iron filings or glass beads.

Where not otherwise specified, the alcohol used is preferably ethyl alcohol.

We claim:
1. An electrophotographic material comprising a non- absorbent conductive support layer and a photoconductive insulating layer of a compound having the formula:

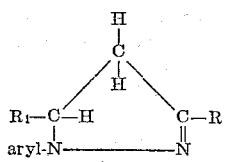

in which R and R₁ are aryl radicals.

2. An electrophotographic material comprising a non-absorbent conductive support layer and a photoconductive insulating layer of a compound having the formula:

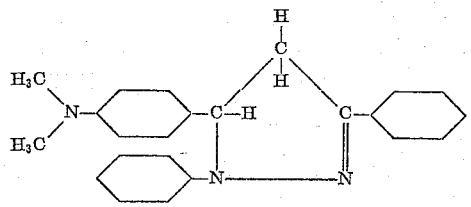

3. An electrophotographic material comprising a non-absorbent conductive support layer and a photoconductive insulating layer of a compound having the formula:

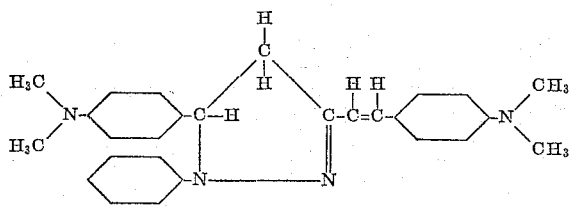

4. An electrophotographic material comprising a non-absorbent conductive support layer and a photoconductive insulating layer of a compound having the formula:

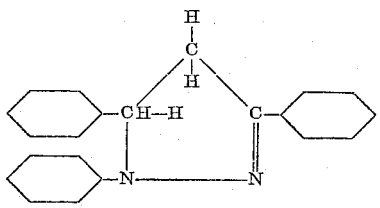

5. An electrophotographic material comprising a non-absorbent conductive support layer and a photoconductive insulating layer of a compound having the formula:

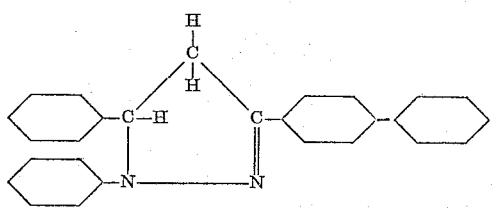

6. An electrophotographic material comprising a non-absorbent conductive support layer and a photoconductive insulating layer of a compound having the formula:

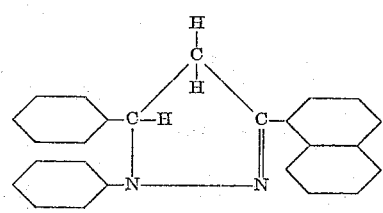

7. An electrophotographic material comprising a non-absorbent conductive support layer and a photoconductive insulating layer of a compound having the formula:

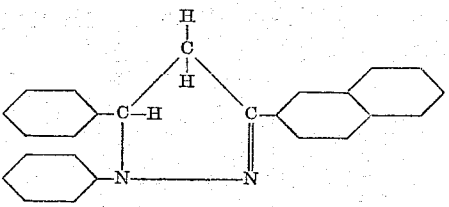

8. An electrophotographic material comprising a non-absorbent conductive support layer and a photoconductive insulating layer of a compound having the formula:

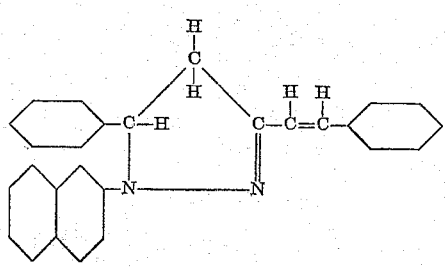

9. An electrophotographic material comprising a non-absorbent conductive support layer and a photoconductive insulating layer of a compound having the formula:

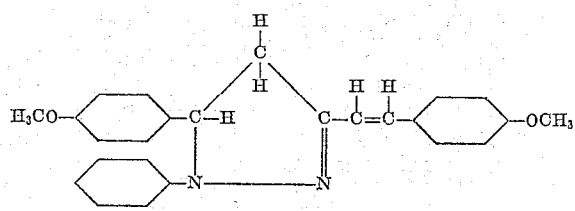

10. An electrophotographic material comprising a non-absorbent conductive support layer and a photoconductive insulating layer of a compound having the formula:

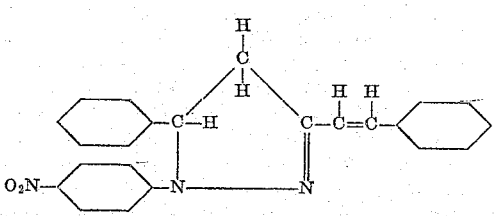

11. An electrophotographic material comprising a non-absorbent conductive support layer and a photoconductive insulating layer of a compound having the formula:

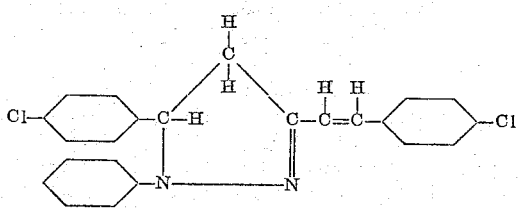

12. A process according to claim 27 in which the photocondutcive layer contains a dyestuff sensitizer that increases the sensitivity of the layer to visible light.

13. A process according to claim 27 in which the photo conductive layer contains an electrically insulating resinous binder.

14. A photographic reproduction process which comprises exposing to an optical image an electrostatically charged photoconductive insulating layer of a compound having the formula:

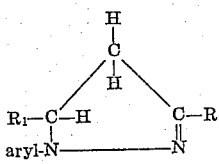

in which R and $R_1$ are aryl groups, to form an electrical image and then developing the electrical image with an electroscopic material.

15. A process according to claim 14 in which the photoconductive layer contains a dyestuff sensitizer that increases the sensitivity of the layer to visible light.

16. A process according to claim 14 in which the photoconductive layer contains an electrically insulating resinous binder.

17. A photographic reproduction process which comprises exposing to an optical image an electrostatically charged photoconductive insulating layer of a compound having the formula:

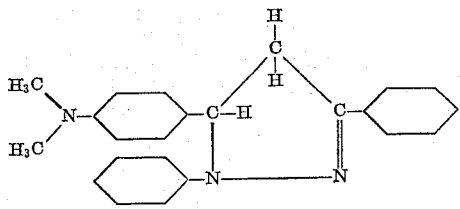

to form an electrical image and then developing the electrical image with an electroscopic material.

18. A photographic reproduction process which comprises exposing to an optical image an electrostatically charged photoconductive insulating layer of a compound having the formula:

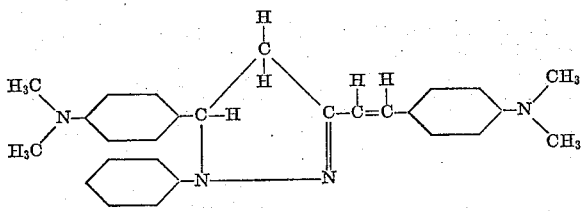

to form an electrical image and then developing the electrical image with an electroscopic material.

19. A photographic reproduction process which comprises exposing to an optical image an electrostatically charged photoconductive insulating layer of a compound having the formula:

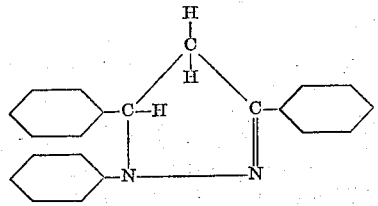

to form an electrical image and then developing the electrical image with an electroscopic material.

20. A photographic reproduction process which comprises exposing to an optical image an electrostatically charged photoconductive insulating layer of a compound having the formula:

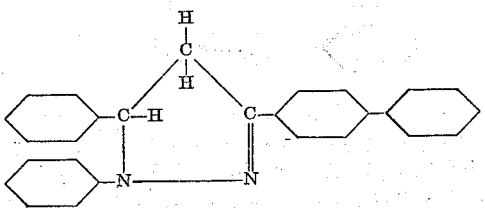

to form an electrical image and then developing the electrical image with an electroscopic material.

21. A photographic reproduction process which comprises exposing to an optical image an electrostatically charged photoconductive insulating layer of a compound having the formula:

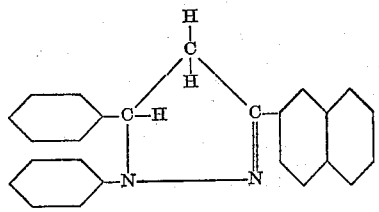

to form an electrical image and then developing the electrical image with an electroscopic material.

22. A photographic reproduction process which comprises exposing to an optical image an electrostatically charged photoconductive insulating layer of a compound having the formula:

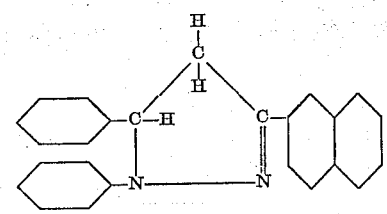

to form an electrical image and then developing the electrical image with an electroscopic material.

23. A photographic reproduction process which comprises exposing to an optical image an electrostatically charged photoconductive insulating layer of a compound having the formula:

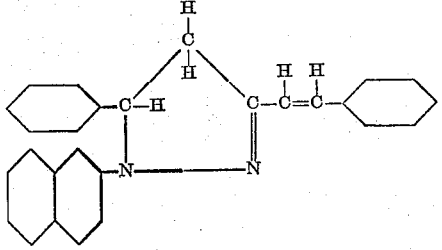

to form an electrical image and then developing the electrical image with an electroscopic material.

24. A photographic reproduction process which comprises exposing to an optical image an electrostatically charged photoconductive insulating layer of a compound having the formula:

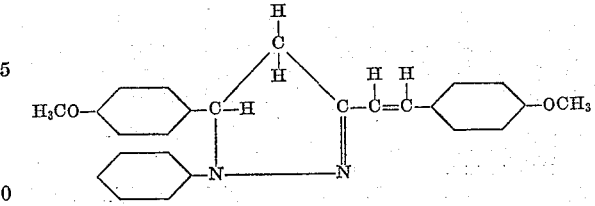

to form an electrical image and then developing the electrical image with an electroscopic material.

25. A photographic reproduction process which comprises exposing to an optical image an electrostatically charged photoconductive insulating layer of a compound having the formula:

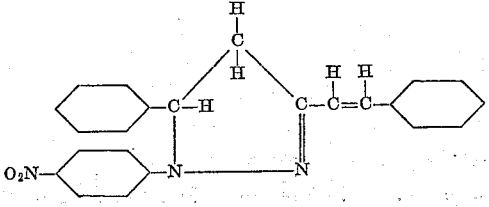

to form an electrical image and then developing the electrical image with an electroscopic material.

26. A photographic reproduction process which comprises exposing to an optical image an electrostatically charged photoconductive insulating layer of a compound having the formula:

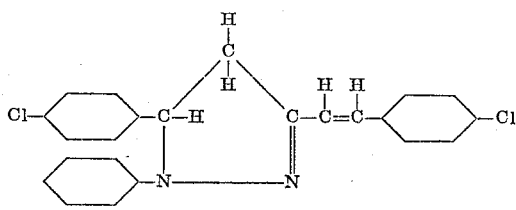

to form an electrical image and then developing the electrical image with an electroscopic material.

27. A photographic reproduction process which comprises exposing an electrostatically charged photoconductive insulating layer on a conductive support layer to light under a master, the photoconductive insulating layer comprising a compound having the formula

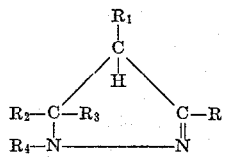

in which R is selected from the group consisting of hydrogen, alkyl, aryl and aralkenyl groups, $R_1$ is selected from the group consisting of hydrogen, alkyl and aryl groups, $R_2$ is selected from the group consisting of hydrogen, aryl and heterocyclic groups, $R_3$ is selected from the group consisting of hydrogen and aryl groups, and $R_4$ is an aryl group, at least one of R, $R_1$, $R_2$, and $R_3$ being an aryl group, and developing the resulting image with an electroscopic material.

28. An electrophotographic material comprising a non-absorbent conductive support layer and a photoconductive insulating layer, the latter comprising a dyestuff sensitizer that increases the sensitivity of the layer to visible light and a compound having the formula

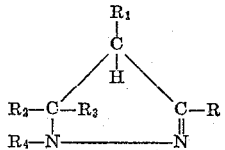

in which R is selected from the group consisting of hydrogen, alkyl, aryl and aralkenyl groups, $R_1$ is selected from the group consisting of hydrogen, alkyl and aryl groups, $R_2$ is selected from the group consisting of hydrogen, aryl and heterocyclic groups, $R_3$ is selected from the group consisting of hydrogen and aryl groups, and $R_4$ is an aryl group, at least one of R, $R_1$, $R_2$, and $R_3$ being an aryl group.

29. An electrophotographic material comprising a non-absorbent conductive support layer and a photoconductive insulating layer, the latter comprising an electrically insulating resinous binder present in a quantity insufficient to inhibit the photoconductive properties of the layer and a compound having the formula:

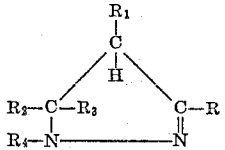

in which R is selected from the group consisting of hydrogen, alkyl, aryl and aralkenyl groups, $R_1$ is selected from the group consisting of hydrogen, alkyl and aryl groups, $R_2$ is selected from the group consisting of hydrogen, aryl and heterocyclic groups, $R_3$ is selected from the group consisting of hydrogen and aryl groups, and $R_4$ is an aryl group, at least one of R, $R_1$, $R_2$, and $R_3$ being an aryl group.

30. An electrophotographic material comprising a non-absorbent conductive support layer and a photoconductive insulating layer comprising an electrically insulating resinous binder present in a quantity insufficient to inhibit the photoconductive properties of the layer and a compound having the formula:

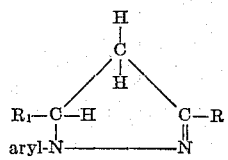

in which R and $R_1$ are aryl groups.

31. An electrophotographic material comprising a non-absorbent conductive support layer and a photoconductive insulating layer comprising an electrically insulating resinous binder present in a quantity insufficient to inhibit the photoconductive properties of the layer and a compound having the formula:

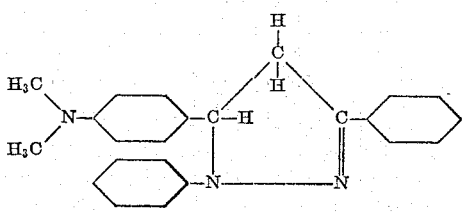

32. An electrophotographic material comprising a non-absorbent conductive support layer and a photoconductive insulating layer comprising an electrically insulating resinous binder present in a quantity insufficient to inhibit the photoconductive properties of the layer and a compound having the formula:

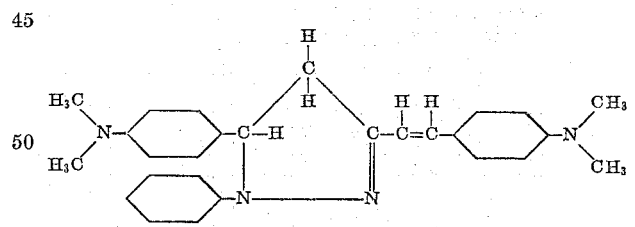

33. An electrophotographic material comprising a non-absorbent conductive support layer and a photoconductive insulating layer comprising an electrically insulating resinous binder present in a quantity insufficient to inhibit the photoconductive properties of the layer and a compound having the formula:

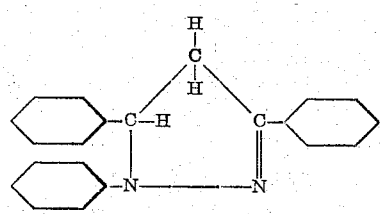

34. An electrophotographic material comprising a non-absorbent conductive support layer and a photoconductive insulating layer comprising an electrically insulating resinous binder present in a quantity insufficient to inhibit the photoconductive properties of the layer and a compound having the formula:

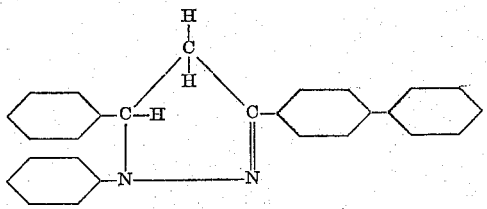

35. An electrophotographic material comprising a non-absorbent conductive support layer and a photoconductive insulating layer comprising an electrically insulating resinous binder present in a quantity insufficient to inhibit the photoconductive properties of the layer and a compound having the formula:

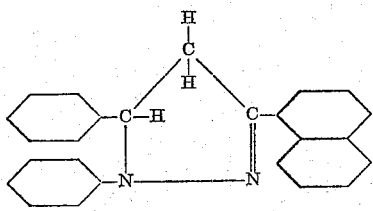

36. An electrophotographic material comprising a non-absorbent conductive support layer and a photoconductive insulating layer comprising an electrically insulating resinous binder present in a quantity insufficient to inhibit the photoconductive properties of the layer and a compound having the formula:

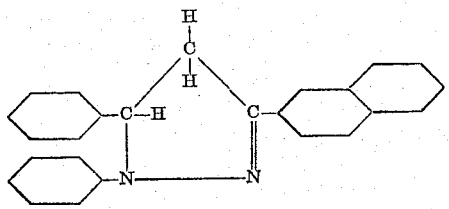

37. An electrophotographic material comprising a non-absorbent conductive support layer and a photoconductive insulating layer comprising an electrically insulating resinous binder present in a quantity insufficient to inhibit the photoconductive properties of the layer and a compound having the formula:

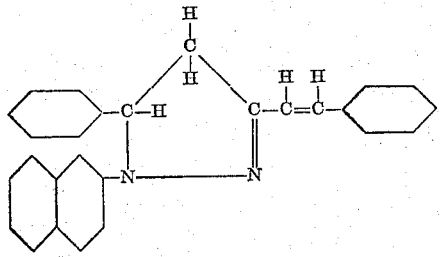

38. An electrophotographic material comprising a non-absorbent conductive support layer and a photoconductive insulating layer comprising an electrically insulating resinous binder present in a quantity insufficient to inhibit the photoconductive properties of the layer and a compound having the formula:

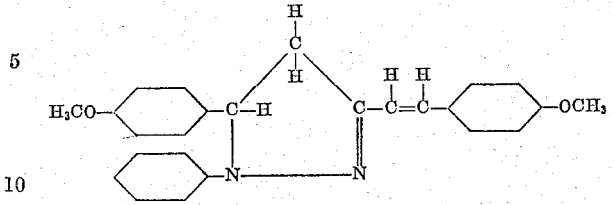

39. An electrophotographic material comprising a non-absorbent conductive support layer and a photoconductive insulating layer comprising an electrically insulating resinous binder present in a quantity insufficient to inhibit the photoconductive properties of the layer and a compound having the formula:

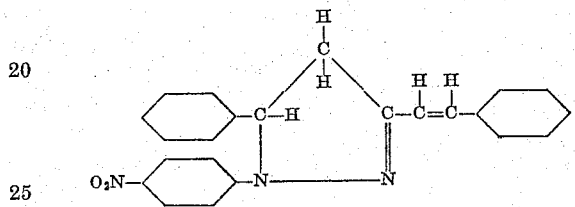

40. An electrophotographic material comprising a non-absorbent conductive support layer and a photoconductive insulating layer comprising an electrically insulating resinous binder present in a quantity insufficient to inhibit the photoconductive properties of the layer and a compound having the formula:

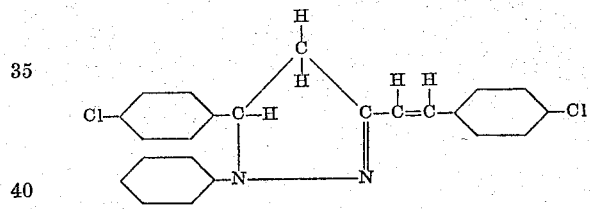

References Cited by the Examiner

UNITED STATES PATENTS

| | | | |
|---|---|---|---|
| 2,297,691 | 10/42 | Carlson | 96—1 |
| 2,663,636 | 12/53 | Middleton | 96—1 |
| 2,692,178 | 10/54 | Grandadam | 96—1 |
| 2,740,793 | 4/56 | Kendall et al. | 260—310 |
| 2,825,814 | 4/58 | Walkup | 96—1 |

OTHER REFERENCES

Puteseiko: Zhur. Fiz. Khim, vol. 22, pages 1172–1180 (1948). (Abstracted in Chem. Abstracts, vol. 43, page 1275 (1949).) (Copy in Div. 60.)

Wainer: Photographic Engineering, vol. 3, No. 1, pages 12–22 (1952). (Copy in Sci. Lib.)

Young et al.: R.C.A. Review, vol. XV, No. 4, pages 469–484 (1954).

Winslow et al.: Journ. Amer. Chem. Soc., vol. 77, pages 4751–4756 (September 1955). (Copy in Scientific Library.)

Lyon et al.: Journ. Chem. Soc., August 1957, pages 3648–3668. (Copy in Scientific Library.)

NORMAN G. TORCHIN, Primary Examiner.

PHILIP E. MANGAN, MILTON STERMAN, ABRAHAM H. WINKLESTEIN, Examiners.